US012700120B2

(12) United States Patent
Vejarano et al.

(10) Patent No.: US 12,700,120 B2
(45) Date of Patent: Aug. 4, 2026

(54) SYSTEM FOR DETERMINING THE SHAPE OF PARTICLES IN MOTION USING AN EVENT-BASED CAMERA

(71) Applicant: PROPHESEE, Paris (FR)

(72) Inventors: Camilo Vejarano, Puteaux (FR); Thomas Rouch, Vincennes (FR)

(73) Assignee: PROPHESEE, Paris (FR)

( * ) Notice: Subject to any disclaimer, the term of this patent is extended or adjusted under 35 U.S.C. 154(b) by 303 days.

(21) Appl. No.: 18/550,904

(22) PCT Filed: Mar. 10, 2022

(86) PCT No.: PCT/EP2022/056236
§ 371 (c)(1),
(2) Date: Sep. 15, 2023

(87) PCT Pub. No.: WO2022/194676
PCT Pub. Date: Sep. 22, 2022

(65) Prior Publication Data
US 2024/0169577 A1 May 23, 2024

(30) Foreign Application Priority Data
Mar. 15, 2021 (EP) .................................... 21162651

(51) Int. Cl.
*G06T 7/62* (2017.01)
*G06T 7/13* (2017.01)
(Continued)

(52) U.S. Cl.
CPC .................. *G06T 7/62* (2017.01); *G06T 7/13* (2017.01); *G06V 10/25* (2022.01); *G06V 10/761* (2022.01); *G06V 20/44* (2022.01)

(58) Field of Classification Search
CPC .. G06T 7/62; G06T 7/13; G06V 10/25; G06V 10/761; G06V 20/44
See application file for complete search history.

(56) References Cited

U.S. PATENT DOCUMENTS

| | | | |
|---|---|---|---|
| 7,920,261 B2 | 4/2011 | Jeys et al. | |
| 2019/0049374 A1* | 2/2019 | Nishihara | .......... G01N 15/1434 |
| 2019/0391067 A1* | 12/2019 | Vercruysse | .......... G01N 15/147 |

FOREIGN PATENT DOCUMENTS

| | | | | |
|---|---|---|---|---|
| KR | 10-2016-0102757 A | 8/2016 | | |
| KR | 20160102757 A * | 8/2016 | ........ | G01N 15/0227 |
| WO | WO-2020056422 A1 * | 3/2020 | ........... | G01N 15/147 |

OTHER PUBLICATIONS

Rodriguez, J. M., Edeskär, T., & Knutsson, S. (2013). Particle shape quantities and measurement Techniques—A review. Electronic Journal of Geotechnical Engineering, 18, 169-198. (Year: 2013).*
(Continued)

*Primary Examiner* — Gregory A Morse
*Assistant Examiner* — Rohan Tejas Mukundhan

(57) ABSTRACT

A method for measuring attributes of a particle in motion comprises observing a region of interest with an event-based sensor oriented such that lines of a pixel array lie across an expected trajectory of the particle through the region of interest; defining two reference lines of pixels separated by a spatial distance; sampling first and second groups of events produced by the reference lines; determining a temporal distance between the groups of events; and calculating a longitudinal speed factor of the particle based on the spatial distance and temporal distance. The method further comprises analyzing one of the groups of events over multiple time steps to produce an outline of the particle in space-time coordinates including spatial components based on positions of event-triggered pixels and temporal components based on time steps; and converting the space-time coordinates to spatial coordinates by multiplying the time steps by the longitudinal speed factor.

9 Claims, 3 Drawing Sheets

(51) Int. Cl.
 *G06V 10/25* (2022.01)
 *G06V 10/74* (2022.01)
 *G06V 20/40* (2022.01)

(56) References Cited

OTHER PUBLICATIONS

Howell, J., Hammarton, T. C., Altmann, Y., & Jimenez, M. (2020). High-speed particle detection and tracking in microfluidic devices using event-based sensing. Lab on a Chip, 20(16), 3024-3035. (Year: 2020).*

International Search Report and Written Opinion of the International Searching Authority dated Jun. 15, 2022, in connection with International Application No. PCT/EP2022/056236, 12 pages.

International Preliminary Report on Patentability dated Sep. 28, 2023, in connection with International Application No. PCT/EP2022/056236, 10 pages.

* cited by examiner

SYSTEM FOR DETERMINING THE SHAPE OF PARTICLES IN MOTION USING AN EVENT-BASED CAMERA

CROSS-REFERENCE TO RELATED APPLICATIONS

This application is a 371 National Stage of International Application No. PCT/EP2022/056236, filed Mar. 10, 2022, which claims priority to European Patent Application No. 21162651.0, filed Mar. 15, 2021, the disclosures of which are herein incorporated by reference in their entirety.

FIELD

The present disclosure relates to the measurement of particle attributes, such as speed and size, using optical systems.

BACKGROUND

Various types of systems exist for measuring various particle attributes, such as concentration and size.

In certain so-called direct imaging systems, a halogen light illuminates particles from the back within a chamber, while a high definition, high magnification camera records passing particles. Recorded video is then analyzed by computer software to measure particle attributes.

Such systems are not adapted to some applications due to the complexity of the image processing and the relatively low frame rate of the cameras.

Patent application US2019-0391067 discloses a system for counting and measuring the speed of analytes crossing a region of interest in a channel. The region of interest is defined by two spaced apart rows of imager pixels perpendicular to the channel. The system cannot determine the shape of the analytes.

SUMMARY

A method for measuring attributes of a particle in motion is generally provided, comprising observing a region of interest with an event-based sensor oriented such that lines of a pixel array of the sensor lie across an expected trajectory of the particle through the region of interest; defining two reference lines of pixels separated by a spatial distance; sampling a first group of events produced by a first of the two reference lines; sampling a second group of events produced by the second of the two reference lines; determining a temporal distance between the second and first groups of events; and providing a longitudinal speed factor of the particle based on the spatial distance and the temporal distance. The particles have a size spanning multiple adjacent pixels in a line, and the method further comprises analyzing one of the first and second groups of events over multiple time steps in order to produce an outline of the particle in space-time coordinates including spatial components based on positions of event-triggered pixels in the lines and temporal components based on the time steps; and converting the space-time coordinates of the outline to spatial coordinates by multiplying the time steps of the space-time coordinates by the longitudinal speed factor.

The method may further comprise measuring respective event rates produced by the two reference lines over multiple time steps; storing a first time step where the event rate measured for the first group of events exceeds a threshold; storing a second time step where the event rate measured for the second group of events exceeds the threshold; and providing the temporal distance as the difference between the second and first time steps.

The method may further comprise the step of measuring each event rate by aggregating events produced by a group of multiple adjoining lines including the corresponding reference lines.

The method may further comprise analyzing the first and second groups of events over multiple time steps in order to produce respective first and second outlines of the particle in space-time coordinates; and cross-correlating the first and second outlines to determine the temporal distance used for determining the longitudinal speed factor.

The method may further comprise, in cross-correlating the outlines, also determining a transversal spatial shift between the outlines in the direction of the lines; providing a transversal speed factor by dividing the transversal spatial shift by the temporal distance; and, in converting the space-time coordinates to spatial coordinates, correcting the spatial components of the space-time coordinates based on the time steps and the transversal speed factor.

The method may further comprise the step of determining size attributes of the particle based on the outline in spatial coordinates.

The method may further comprise the step of determining the volume of the particle based on the outline in spatial coordinates and an assumption on the cross-section of the particle perpendicular to the longest axis of the outline.

The method may further comprise using multiple thresholds to determine multiple corresponding temporal distances; and averaging the temporal distances.

A droplet attribute analysis arrangement is also provided, comprising a nozzle configured to project droplets on a surface; an event-based camera fixedly attached to the nozzle; and an optical device attached to the nozzle, oriented such that it allows the camera to observe a region of interest between the nozzle and the surface; wherein the camera includes a processor programmed to observe the region of interest with an event-based sensor oriented such that lines of a pixel array of the sensor lie across an expected trajectory of the particle (P) through the region of interest; define two reference lines of pixels separated by a spatial distance; sample a first group of events produced by a first of the two reference lines; sample a second group of events produced by the second of the two reference lines; determine a temporal distance between the second and first groups of events; and provide a longitudinal speed factor of the particle based on the spatial distance and the temporal distance.

BRIEF DESCRIPTION OF THE DRAWINGS

Other advantages and features will become more clearly apparent from the following description of particular embodiments of the invention provided for exemplary purposes only and represented in the appended drawings, in which.

US 12,700,120 B2

3

Figure 1:
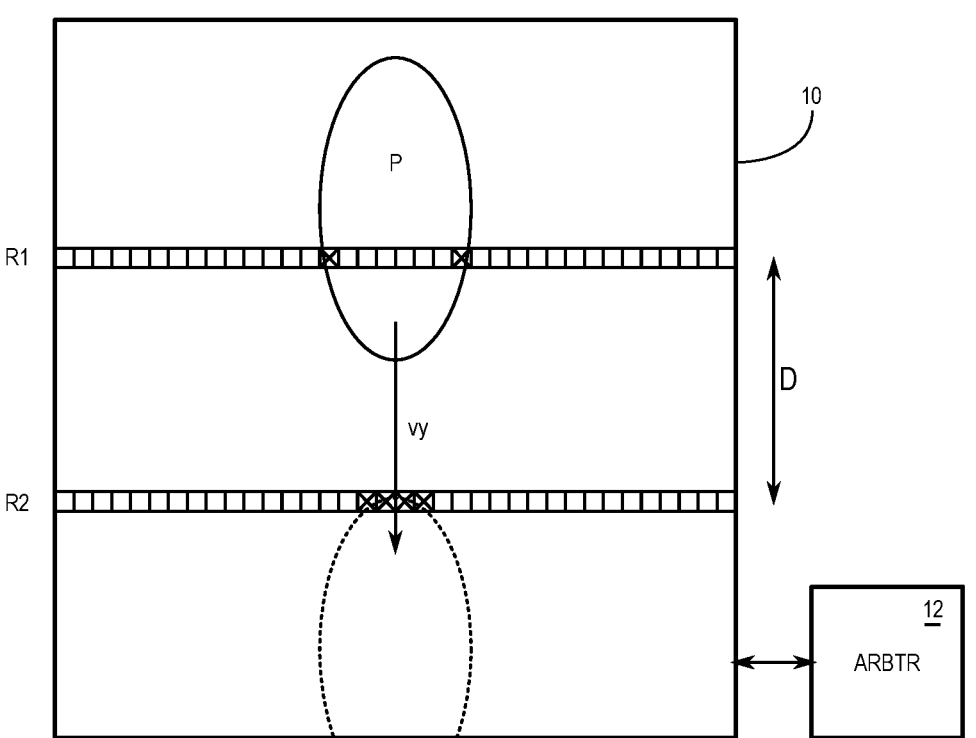
FIG. 1 schematically shows an organization of an event-based sensor array, wherein two selected rows of pixels are used for measuring attributes of particles crossing the field of view of the sensor perpendicularly to the rows.
Figure 4:
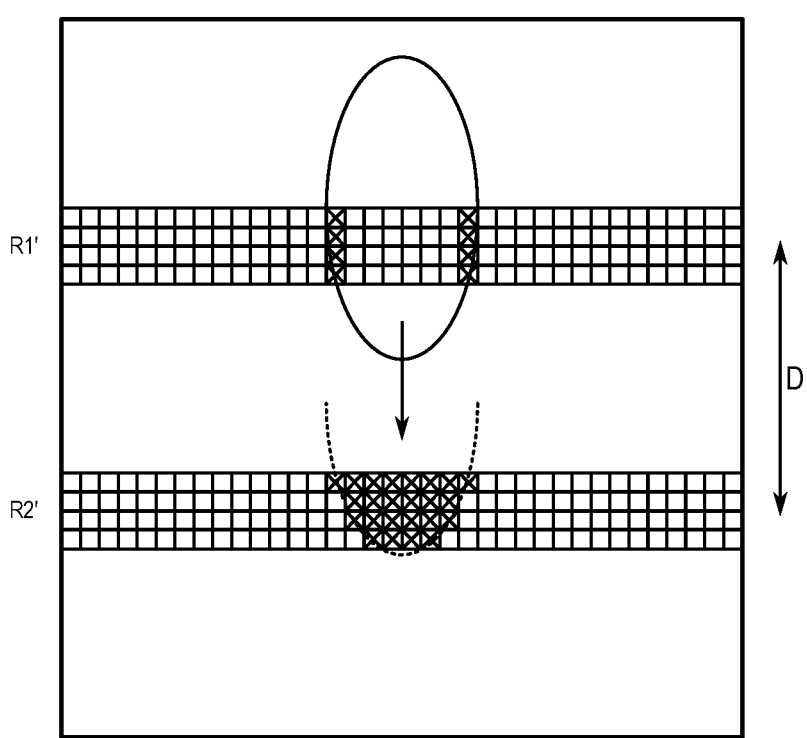
FIG. 4 shows an alternative organization of an event-based sensor array, including two groups of adjoining rows.
Figure 5:
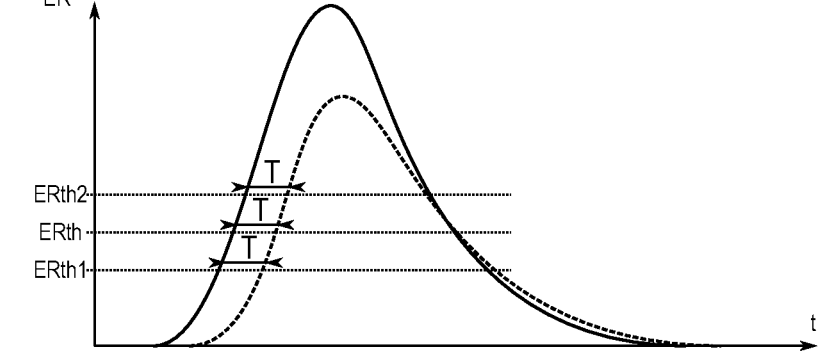
Figure 6:
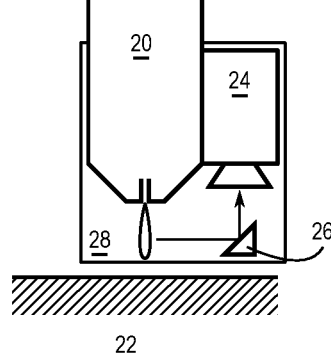
Figure 7:
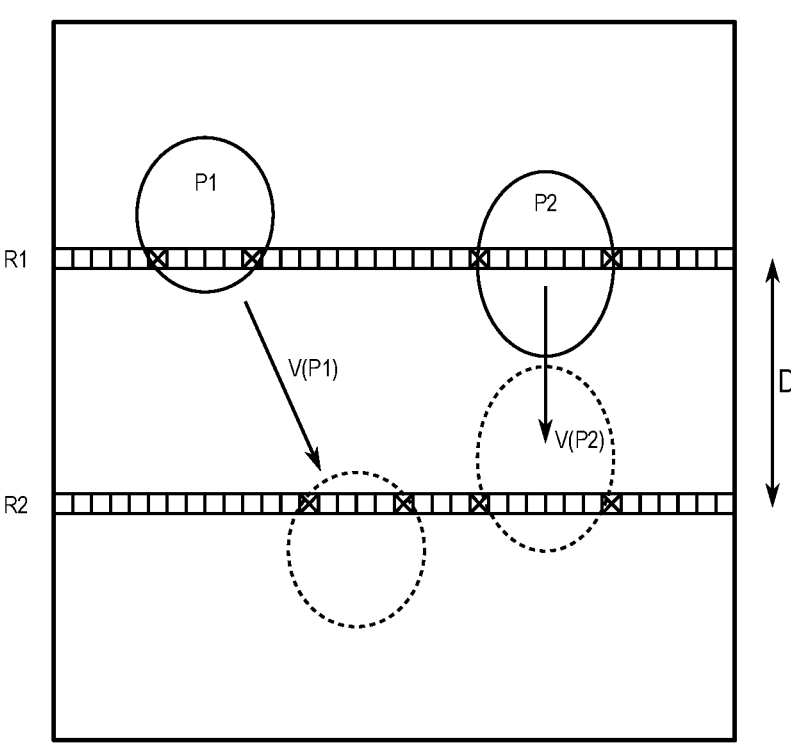
Figure 8A:
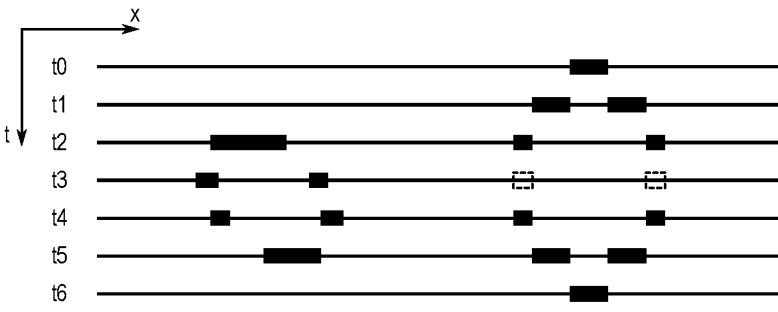
Figure 8B:
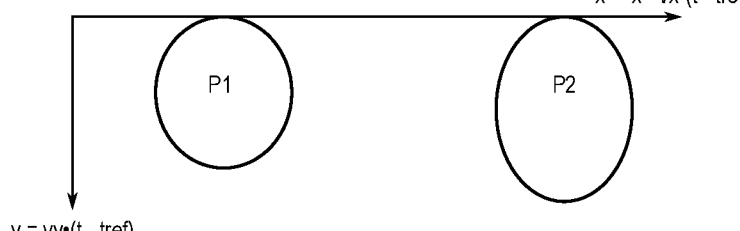

FIG. 5 shows exemplary event rate evolutions in the sensor organization of FIG. 4, as a particle crosses the two groups of rows in sequence;

FIG. 6 schematically shows an exemplary event-based camera arrangement, configured to measure attributes of droplets produced by a moving nozzle;

FIG. 7 shows the event-based array organization of FIG. 1, viewing multiple particles crossing the two rows simultaneously; and FIGS. 8A and 8B illustrate two steps in a process for measuring attributes of the multiple particles crossing the rows.

DETAILED DESCRIPTION

Direct imaging particle analyzers, due to the complex image processing they implement, do not allow real-time analysis of a flow of particles, and are not suited, for instance, for continuous process monitoring systems. Moreover, typical frame rates of the cameras are not adapted to fast flows of particles within a reduced volume, such as the case of nozzles projecting fluids on a surface only a few millimeters away. For instance, in the case of inkjet printers, ink droplets may be projected at 10 m/s over a distance seldom exceeding 5 mm, whereby the droplet can only be seen by the camera for less than 0.5 ms.

The present disclosure overcomes such limitations by using specific features of an event-based camera and of the data such a camera produces. Event-based cameras can react fast enough in such circumstances and are small enough to analyze constricted regions of interest, such as between an inkjet nozzle and the projection surface. Also, the specific nature of the data produced by an event-based camera may be manipulated to reduce the processing complexity, to the extent that the resulting particle analyzer can be used in real-time.

In particular, although an event-based camera may include a sensor array having many rows and columns of pixels, conforming for instance to the VGA standard, the array will not be used to capture 2D images for processing, in the manner images could be processed conventionally with a frame-based camera. Instead, a few reference rows dispersed in the array will be used in a scanner mode, oriented perpendicular to the expected trajectory of the particles. As little as two reference rows may be sufficient to perform particle attribute measurements, such as speed and size.

FIG. 1 schematically illustrates a sensor array 10 of an event-based camera, arranged such that particles P travelling through a region of interest cross the field of vision of the camera perpendicularly to the rows.

Each pixel of an event-based sensor array is designed to generate an "event" asynchronously each time its measured brightness changes by more than a threshold value. Events usually convey a direction indication, i.e. a positive direction for an increase in brightness and a negative direction for a decrease in brightness. The events are typically signaled as they come to an arbiter and readout circuit 12. The arbiter circuit organizes the readout of the signaled events. A read out event is completed with a timestamp corresponding, for instance, to the time of readout and a position corresponding to the address of the pixel in the array.

In FIG. 1, two reference rows R1, R2, separated by a distance D on the sensor array, are selected for the analysis process. The two rows are located, for instance, at ⅓ and ⅔ of the array height.

In travelling across the field of view, a particle P crosses rows R1 and R2 in turn. Two positions of the particle P are shown at different times, respectively in solid and dotted lines.

In the first position, the particle is almost halfway across row R1 and the edges of the particle intersect the row at only two pixels, on either side of the particle, marked by crosses. In this situation, assuming the body of the particle has a uniform shade contrasting with the background, very few pixels of the row, only those that see the edges of the particle, generate an event. In fact, even no event may be generated if the edges of the particle are perpendicular to the row.

In the second position, the particle is about to leave row R2, and its trailing edge intersects row R2 at four adjacent pixels, marked by crosses. In this situation, where the edge intersecting the row is almost parallel to the row, many pixels may generate an event.

Figure 2:
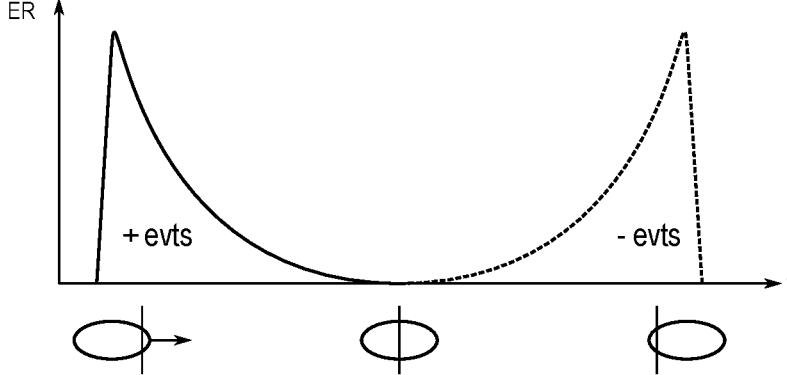
FIG. 2 shows an exemplary and near ideal event rate evolution of a row crossed by a particle.

FIG. 2 shows an exemplary and near ideal event rate evolution ER of a row crossed by an ellipsoidal particle such as that of FIG. 1. The event rate is the number of events read out per unit of time, as defined, for instance, by a clock used to assign the timestamps. The unit of time may be as small as 5 μs.

When the leading edge of the particle hits the row, many pixels of the row see a change and the event rate raises abruptly. The events are shown as positive, i.e. the pixels sense an increase in brightness, assuming the body of the particle has a lighter shade than the background, which corresponds to a region of interest illuminated from the front.

When the leading edge has crossed the row, the positive event rate gradually decreases as the edges of the particle tend to become perpendicular to the row. The event rate is minimal when the particle is halfway across the row.

As the particle departs from the middle position, the edges depart from their perpendicular stance, causing the generation of opposite polarity events, i.e. negative events.

The negative event rate reaches a peak about when the trailing edge of the particle reaches the row. After that, the negative event rate decreases abruptly towards zero.

Figure 3:
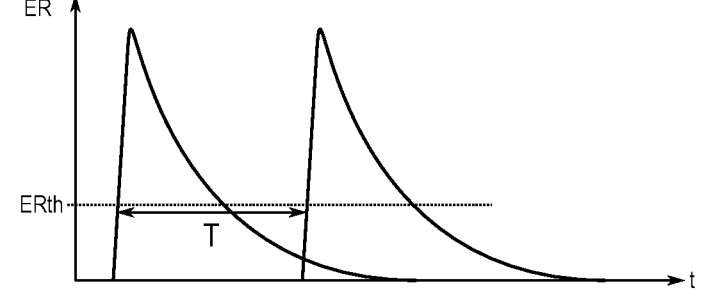
FIG. 3 shows exemplary event rate evolutions of the two rows, as a particle crosses the two rows in sequence.

FIG. 3 shows exemplary event rate evolutions of the two rows R1, R2, as the particle crosses the two rows in sequence. In the present situation, only one type of events may be analyzed, for instance the positive events, which arrive first. As shown, each of the rows produces a similar event rate curve, separated in time by a value T. The value T is the time taken by the particle to travel, in the region of interest, from the position corresponding to row R1 to the position corresponding to row R2.

By determining the time T, a longitudinal speed vy (indicated in FIG. 1) may be calculated as D/T, where D is the distance on the sensor array between the two rows R1, R2, i.e. D is an image plane distance, whereby vy is an image plane speed. Knowing the object plane distance D' corresponding to the image plane distance D, and assuming the particles travel vertically, the vertical object plane speed Vy of the particle is calculated as Vy=vy·D'/D=D'/T.

The object plane distance D' may be determined based on the distances of the particle and the sensor array from the focal point of the camera's lens.

Value T is the temporal distance between the event rate curves produced by the two rows R1, R2. It may conventionally be determined by cross-correlating the two curves. In the present situation, the characteristic steep rising edges of the positive event rate curves allow using a simpler method—the event rates are compared to a threshold ERth, and the time T is the difference between the times when the event rates of rows R1 and R2 each exceed the threshold, as shown.

With this organization, high particle speeds may be measured in constrained regions of interest, with low complexity processing.

The remaining information from the events may be used to determine the particle size. Indeed, the addresses of the events determine the positions of the edges of the particle, i.e. the outline of the particle. More specifically, the leading edge of the particle is outlined by the first batch of events (the positive events when the particle body is of a lighter shade than the background), then the trailing edge is outlined by the second batch of events (the negative events). By recording the event positions over multiple time steps for one of the rows, an outline of the particle is produced in space-time coordinates (x, t), where the spatial components x are the positions of the events in the row and the temporal components t are the time steps.

With such coordinates, the outline does not actually represent the spatial shape of the particle, since similar outlines would be produced for a short slow-moving particle and an elongated fast-moving particle.

To produce an outline in spatial coordinates, the temporal components t of the outline in space-time coordinates are simply multiplied by the calculated speed (Vy or vy).

Once the outlines are defined in spatial coordinates, various attributes may be calculated from the outlines, such as width and length from the smallest and largest axes of the outline. Based on assumptions on the cross-section of the particles perpendicular to the longest axis of the outlines, volumes may also be calculated from the outlines. For instance, projected droplets will typically have a revolution shape around their longest axis, which will usually be along the droplet trajectory.

When determining the temporal distance T based on threshold detections as exemplified above, using only single rows may in practice cause inaccuracies due to noise and the production of a relatively small number of events, especially when the particles are narrow, i.e. spanning only a few pixels of the rows.

FIG. 4 illustrates a more robust organization of a sensor array for use with threshold detections. Each of the rows is replaced by a group R1', R2' of adjoining rows. The events produced by the rows of each group are aggregated to produce an event rate for the group. The event rate is thus multiplied by the number of rows in each group. Moreover, an averaging effect is produced that spreads the event rate curves.

FIG. 5 shows exemplary positive event rate evolutions in the sensor organization of FIG. 4, as a particle crosses the two groups of rows in sequence. In comparison with the curves of FIG. 3, those of FIG. 5 are more spread out and the rising edges are less abrupt. Also, the second curve, shown in dotted lines, is exemplified as being squatter than the first curve, which illustrates a variation in shape of the particle, for instance a droplet that elongates and becomes narrower between the two groups of rows.

Even if the particle shape varies, it appears that the rising speeds of the two curves are similar, because they correspond to the maximum speed at which a burst of events is processed by the system, irrespective of the number of events in the burst. With such a characteristic, the threshold detection method remains valid for determining the temporal distance T between the curves. In order to increase robustness, multiple thresholds ERth, ERth1, ERth2 may be used similarly, as shown, and an average is produced over the temporal distances T resulting from the multiple thresholds.

This more robust method for determining the temporal distance T may be combined with the use of single rows for determining the particle outline, as explained above.

FIG. 6 schematically shows an exemplary event-based camera arrangement, configured to measure attributes of droplets produced by a moving dispenser nozzle, such as ink droplets projected by an inkjet printer. The nozzle 20 may be configured to scan a surface 22 at a constant distance, typically a few millimeters, and to project droplets of an accurate volume at accurate positions. The projection speed is also an important quality factor in such devices.

An event-based camera 24 operating according to the principles mentioned above may be attached to the nozzle, oriented to observe the surface 22. An optical device 26 such as a mirror, prism or optical fibers may be placed in front of the camera lens such that the region of interest between the nozzle and the surface is fed back to the camera lens. A small light source, such as an LED, not shown, may be attached next to the mirror to illuminate the region of interest. The camera, mirror and light source may be attached to a plate 28 that is in turn attached to a side of the nozzle.

An event-based camera is well adapted to such an arrangement, because it can be made small and light enough to not impede proper operation of the nozzle, while offering the required speed and resolution for the particle analysis needs.

The particle analyzer arrangements discussed up to now are well adapted to the analysis of particles that cross the rows one at a time, i.e. particles that are produced in sequence from a single source, or particles that are not produced simultaneously from multiple sources.

Analyzer arrangements disclosed hereinafter are, in contrast, adapted to situations where multiple particles may cross a row simultaneously.

In FIG. 7, with an event-based sensor array arrangement similar to that of FIG. 1, two particles P1 and P2 cross the region of interest substantially simultaneously, as an example. In particular, there is a time overlap where particles P1 and P2 simultaneously intersect row R1, and a time overlap where they simultaneously intersect row R2. The particles P1 and P2 have respective different speeds V(P1) and V(P2), and particle P1 moves obliquely instead of vertically, and faster than particle P2. Speed V(P1) is thus a vector having a vertical or longitudinal speed component vy, and a transversal speed component vx. Speed V(P2) may also be considered as a vector, having a zero transversal speed component.

In such a situation, since two or more particles may intersect a row simultaneously, a criterion based solely on the event rates is not adapted for differentiating individual particles.

In order to differentiate the particles, the positions of the events are now used to produce outlines in space-time coordinates for each row. Events read out for a row may thus define multiple closed outlines, where each closed outline corresponds to an individual particle.

FIG. 8A illustrates what the row R1 could yield in the example of FIG. 7, over successive time steps t0-t7.

At a time step t0, the leading edge of particle P2 hits row R1, intersecting for example two adjacent pixels. The events generated by these two pixels, e.g. of positive polarity when the particle body shade is lighter than the background, define two points of the beginning of the outline of particle P2.

At time step t1, the leading edge of particle P2 intersects the row at two separated pairs of pixels. The events generated by these pixels define four new points of the outline of particle P2.

At time step t2, the leading edge of particle P1 hits the row, intersecting for example four adjacent pixels, while the leading edge of particle P2 intersects two new separated pixels. Now three separated groups of positive events are generated in the row, and a decision needs to be taken as to the points that belong to the outline of particle P2, and the points that could belong to a new particle.

Obviously, the two right-most points belong to the outline of particle P2, since the pixels in between have not changed and assume the values they acquired at steps t0 and t1.

In practice, due to noise, blurry edges, or shade variations, pixels within the particle body or nearby may spuriously change, and decisions as to the number of particles and the pixels belonging to the particles are not that clear, at least when observing only the current row and its immediate history. In such circumstances, known object separation algorithms may be used, even if they have been implemented with frame-based imagers. For instance, Subramanian S. et Al., "A Memory Efficient Algorithm for Real Time Object Counting", in 2009 IEEE International Advance Computing Conference (IACC 2009), disclose a simple algorithm based on the analysis of two adjacent rows of a frame-based scanner. The two adjacent rows, in frame-based mode, represent a current row and its immediate history, which is analogous, in the present situation, to the same event-based row observed at two consecutive time steps.

At time step t3, two new points are defined for the outline of particle P1, whereas no changes occur for particle P2, because the edges of particle P2 are perpendicular to the row. In this case, the previous two points found for the outline are duplicated, as shown in dotted lines.

At time step t4, the trailing edges of particles P1 and P2 intersect the row, each at two separate pixels. This time the intersected pixels generate events of negative polarity, which are also counted as outline pixels.

At time step t5, the trailing edge of particle P1 leaves the row, while the trailing edge of particle P2 still intersects the row.

At time step t6, the trailing edge of particle P2 leaves the row.

At this stage, two outlines have been produced in space-time coordinates for row R1, belonging to two distinct particles. The outlines may be stored individually in a running list of particles "detected" by row R1, with a reference timestamp, such as the time step at which the trailing edge leaves the row, i.e. t5 for particle P1 and t6 for particle P2.

It can be noted that the dimensions of the particle outlines along the time axis do not match the spatial dimensions shown in FIG. 7. Moreover, due to the oblique trajectory of particle P1, the outline is skewed. As mentioned before, such outlines in space-time coordinates cannot be directly used to evaluate the particle sizes. For that purpose, the outlines are converted to spatial coordinates using the particle speeds, the speeds being determined, for instance, as follows.

Row R2 is processed similarly as row R1 to trace the outline of each particle that crosses row R2 in space-time coordinates. Then, each time a particle leaves the row, it is compared to the particles stored in the running list, for instance using cross-correlation. In principle, assuming speed and rotation do not vary over the very short distance of the region of interest, the corresponding outlines should match closely.

When a match is found, a displacement vector is formed with a spatial component d equal to the difference between the transversal components of the matching outlines, and a time component T equal to the difference between the reference timestamps of the outlines.

A speed vector V(P) is determined having a transversal component vx=d/T and a longitudinal component vy=D/T, where d and D are distances in the image plane, that can also be converted to distances in the object plane to produce a speed vector in the object plane.

As shown in FIG. 8A, finally, the matching outline from the running list is converted to spatial coordinates (x', y') and de-skewed by applying vector V(P) to the space-time coordinates (x, t), i.e.

$$x'=x-vx\cdot(t-\text{tref})$$

$$y'=vy\cdot(t-\text{tref})$$

Where tref is the reference timestamp stored with the outline in the running list.

The matching outline may then be removed from the running list in order to reduce the number of comparisons required for processing the next particles leaving row R2.

The particle analysis method is thus applicable to multiple particles travelling at different speeds and even different angles. However, when the travel angles are different, it is possible that particles come to overlap temporarily, in particular when crossing one of the rows R1, R2. In such a case, the particles are not separable by analyzing one of the rows, whereby the matching operation at row R2 will fail by missing at least one of the two overlapping particles.

In order to overcome this situation, more than two reference rows may be distributed over the sensor array. In such a case, when two particles overlap at one row, at least two other rows will see the particles separated, and can be used as explained above.

In other words, for each row but the last, a running list of outlines is maintained. If a particle leaving the second row does not find a match in the first running list, its outline is stored in the second running list. Then, when the particle leaves the third row, its outline is searched in the second running list, and a match will be found there, in principle, which means that the particle was hidden by another particle when crossing the first row.

If a particle is hidden when crossing the second row, no matching operation is triggered by the particle, but the first running list will contain a matching outline from when the particle crossed the first row. A matching operation is triggered when that particle crosses the third row—no match being found then in the second list, a matching operation is attempted with the first list, which then succeeds.

Multiplying the number of reference rows in this way not only overcomes the difficulties of overlapping particles, but also makes the system more robust to noise.

The above embodiments have been described with reference to rows of pixels of a sensor array, because sensor arrays are typically processed row by row, and therefore the use of rows for analyzing moving particles is straightforward. However, depending on the circumstances, other pixel alignments may be used, such as columns, diagonals, or even curved or arcuate lines of pixels.

The invention claimed is:

1. A method for measuring attributes of a particle in motion, the method comprising:

observing a region of interest with an event-based sensor oriented such that lines of a pixel array of the sensor lie across an expected trajectory of the particle through the region of interest, wherein the event-based sensor comprises pixels that asynchronously generate events in response to changes in brightness;

defining two reference lines of pixels separated by a spatial distance;

sampling a first group of events produced by a first of the two reference lines;

sampling a second group of events produced by a second of the two reference lines;

determining a temporal distance between the second and first groups of events;

calculating a longitudinal speed factor of the particle by dividing the spatial distance by the temporal distance, wherein longitudinal refers to a direction perpendicular to the reference lines, wherein the particles have a size spanning multiple adjacent pixels in a line;

analyzing one of the first and second groups of events over multiple time steps in order to produce an outline of the particle in space-time coordinates including spatial components based on positions of event-triggered pixels in the lines and temporal components based on the time steps; and converting the space-time coordinates of the outline to spatial coordinates by multiplying the time steps of the space-time coordinates by the longitudinal speed factor to obtain a first spatial coordinate while a second spatial coordinate is derived from the spatial component.

2. The method of claim 1, comprising:

measuring respective event rates produced by the two reference lines over multiple time steps;

storing a first time step where the event rate measured for the first group of events exceeds a threshold;

storing a second time step where the event rate measured for the second group of events exceeds the threshold; and providing the temporal distance as a difference between the second and first time steps.

3. The method of claim 2, comprising the step of measuring each event rate by aggregating events produced by a group of multiple adjoining lines including the corresponding reference lines.

4. The method of claim 1, comprising:

analyzing the first and second groups of events over multiple time steps in order to produce respective first and second outlines of the particle in space-time coordinates; and cross-correlating the first and second outlines to determine the temporal distance used for calculating the longitudinal speed factor.

5. The method of claim 4, comprising:

in cross-correlating the outlines, also determining a transverse spatial shift between the outlines in a direction of the lines;

providing a transverse speed factor by dividing the transverse spatial shift by the temporal distance; and in converting the space-time coordinates to spatial coordinates, correcting the spatial components of the space-time coordinates based on the time steps and the transverse speed factor.

6. The method of claim 1, comprising the step of determining size attributes of the particle based on the outline in spatial coordinates.

7. The method of claim 1, comprising the step of determining a volume of the particle by:

(a) assuming the particle has a cross-section of revolution shape perpendicular to the longest axis of the outline; and (b) calculating volume based on the outline dimensions in spatial coordinates and the assumed revolution shape using integration of cross-sectional areas along the longest axis.

8. The method of claim 2, comprising:

using multiple thresholds to determine multiple corresponding temporal distances; and averaging the temporal distances.

9. A droplet attribute analysis arrangement, comprising:

a nozzle configured to project droplets on a surface;

an event-based camera fixedly attached to the nozzle, wherein the event-based camera comprises pixels that asynchronously generate events in response to changes in brightness; and an optical device attached to the nozzle, oriented such that it allows the camera to observe a region of interest between the nozzle and the surface;

wherein the camera includes a processor programmed to:

observe the region of interest with an event-based sensor oriented such that lines of a pixel array of the sensor lie across an expected trajectory of a particle through the region of interest;

define two reference lines of pixels separated by a spatial distance;

sample a first group of events produced by a first of the two reference lines;

sample a second group of events produced by the second of the two reference lines;

determine a temporal distance between the second and first groups of events; and calculate a longitudinal speed factor of the particle by dividing the spatial distance by the temporal distance, wherein longitudinal refers to a direction perpendicular to the reference lines.

* * * * *